United States Patent [19]

Nabeyama et al.

[11] 3,898,376

[45] Aug. 5, 1975

[54] STILL PICTURE BROADCASTING RECEIVER

[75] Inventors: Hiroaki Nabeyama, Yokohama; Teruhiro Takezawa; Michio Masuda, both of Tokyo; Katsuo Mohri, Yokohama; Masaaki Fukuda, Tokyo, all of Japan

[73] Assignees: Hitachi, Ltd.; Hitachi Electronic Ltd., both of Japan

[22] Filed: Aug. 20, 1973

[21] Appl. No.: 389,737

[30] Foreign Application Priority Data

Aug. 23, 1972 Japan ................................ 47-83730

[52] U.S. Cl. .................... 178/5.8 R; 178/DIG. 23; 178/69.5 TV; 179/15 BS

[51] Int. Cl. .......................... H04n 5/44; H04n 5/04

[58] Field of Search .. 178/5.8 R, DIG. 23, 69.5 TV, 178/6.6 R; 179/15 BS

[56] References Cited

UNITED STATES PATENTS

| | | | |
|---|---|---|---|
| 3,757,044 | 9/1973 | Verhoeckx | 178/69.5 TV |
| 3,811,008 | 5/1974 | Lee | 178/DIG. 23 |
| 3,814,855 | 6/1974 | Kokado | 178/69.5 TV |

*Primary Examiner*—Robert L. Richardson
*Assistant Examiner*—Mitchell Saffian
*Attorney, Agent, or Firm*—Stevens, Davis, Miller & Mosher

[57] ABSTRACT

A receiver for receiving a composite signal consisting of a multiplexed video signal and pulse code modulated audio signal time division multiplexed in a predetermined sequence and having a first synchronizing signal synchronized with the audio signal code modulated pulses, and a second synchronizing signal including a number of synchronizing signals required for the reproduction of the multiplexed video and audio signals, wherein the first and second synchronizing signals are inserted in predetermined locations in the multiplexed video and audio signals. The receiver comprises a circuit for deriving the first synchronizing signal and for reproducing a synchronizing signal synchronized with the pulse code modulated audio signal, a circuit for deriving and reproducing at least a synchronizing signal out of the second synchronizing signals which is required for the reproduction of the video signal by using the reproduced first synchronizing signal from the first synchronizing signal, a circuit for deriving the video signal from the composite signal and adding thereto the reproduced synchronizing signal required for the reproduction of the video signal in a manner that the synchronizing signal can be detected by the amplitude separation from the video signal, and a circuit for recording the video signal added with the synchronizing signal and for repeatedly reproducing the composite video signal.

7 Claims, 10 Drawing Figures

STILL PICTURE BROADCASTING RECEIVER

BACKGROUND OF THE INVENTION

The present invention relates to a receiver for a composite signal such as a still picture broadcasting signal which consists of a multiplexed video signal and pulse code modulated audio signal time division multiplexed in a predetermined sequence and having a first synchronizing signal synchronized with the pulse code modulated audio signal and a second synchronizing signal including a number of synchronizing signals required for the reproduction of said video and audio signals, wherein the first and second synchronizing signals are sequentially inserted in predetermined locations in said video and audio signals.

More particularly, the present invention relates to a receiver for selectively deriving a desired video signal from the above-mentioned broadcasting signal. The selected video signal is added with a synchronizing signal required for the reproduction of said video signal and being reproduced from the second synchronizing signal, and the video signal together with the added synchronizing signal is recorded. The receiver thus displays the selected still picture broadcasting signal on a display device.

The present invention is particularly suitable for use in a still picture broadcasting signal receiver.

In a still picture signal transmission system, the video signal and the audio signal are transmitted alternately, i.e., time division multiplexed in a predetermined sequence. In one type of a still picture broadcasting signal, a 1/30 second period video signal and a 1/15 second period audio signal are alternately transmitted in different times. The video signal is transmitted at each horizontal scanning period of $1/f_H$ (=63.5 $\mu$s) just the same as a present standard television signal and the audio signal is transmitted as a pulse code modulated time division multiplex signal and at a period $1/f_A$ different from that of the video signal. Accordingly, the required synchronizing signals for reproducing the video and audio signals are transmitted in different periods, namely in the $1/f_H$ period during the transmission of the video signal and the $1/f_A$ period during the transmission of the audio signal. The synchronizing signal comprises a blanking period, a PCM frame pattern signal (PFP signal) comprising a 16 bit signal which is synchronized with the modulated pulse series of the audio multiplex signal and a mode control code signal (MCC signal) comprising a horizontal synchronizing signal, audio PCM frame synchronizing signal, frame signal, etc.

In such a still picture broadcasting signal, the PFP signal is so formed as being unable of effecting amplitude separation from the video signal or from the audio PCM signal.

Accordingly, the selectively derived out video signal from the still picture broadcasting signal does not include vertical and horizontal synchronizing signals which can be separated by amplitude separation as is possible in a case of an ordinary television signal.

For the above reason, the conventional television receiver cannot be used as a display device of a still picture broadcast.

SUMMARY OF THE INVENTION

The present invention has for its object to provide a novel receiver suitable for effectively receiving a still picture broadcasting signal.

Namely, the object of the present invention is to provide a receiver having a means for deriving and reproducing the synchronizing signals included in the still picture broadcasting signal in a manner to enable amplitude separation of the synchronizing signals from the video signal.

A further object of the present invention is to obtain a receiver provided with means for recording a selectively derived video signal from a still picture broadcasting signal after adding the synchronizing signal in a manner that the synchronizing signal can be derived by amplitude separation.

A still further object of the present invention is to obtain a still picture broadcasting signal receiver, in which the selected video signal from the broadcasting signal can be displayed by an ordinary image display device such as a conventional NTSC television receiver.

In accordance with one aspect of the present invention, the receiver for receiving a composite still picture broadcasting signal consisting of a video signal and a pulse code modulated audio signal intermittently transmitted in a predetermined sequence and having a first synchronizing signal synchronized with said code modulated pulses and a second synchronizing signal including a number of synchronizing signals required for the reproduction of said video signal and said audio multiplex signal, comprises;

a means for deriving the first synchronizing signal and for reproducing the same, a means for deriving the second synchronizing signal by using the reproduced first synchronizing signal and for reproducing the plurality of the synchronizing signals contained therein, a means for deriving a video signal from the composite signal, a means for adding a synchronizing signal in the reproduced synchronizing signals required for reproduction of a video signal with said video signal in an amplitude separable manner, and a means for recording the video signal added with the synchronizing signal.

According to the present invention, a video signal provided with a synchronizing signal being unable to make amplitude separation can be reproduced by an ordinary NTSC television receiver.

DESCRIPTION OF THE PREFERRED EMBODIMENT

One example of a still picture broadcasting signal, which can be suitably received and reproduced by a receiver according to the present invention will be explained by referring to FIGS. 1 and 2.

Figure 1:
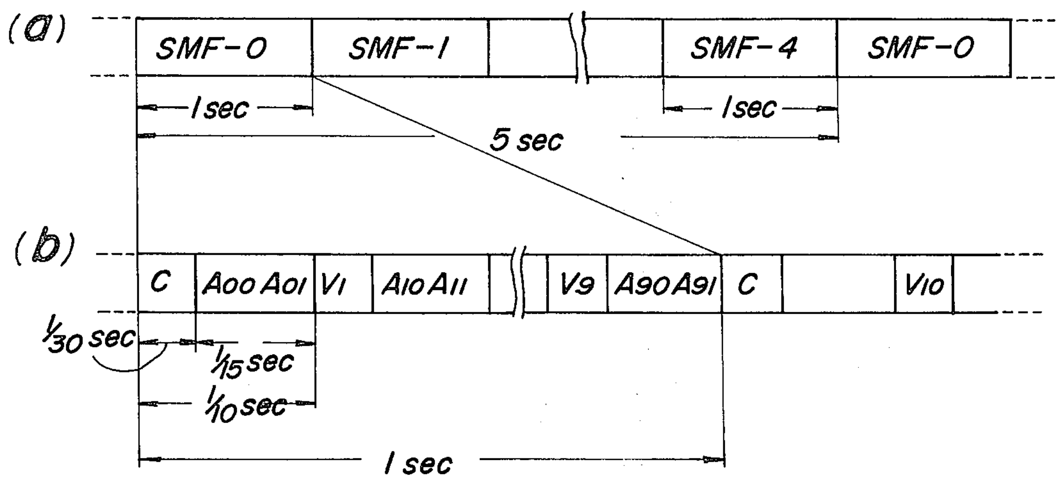
FIGS. 1 and 2 are charts for explaining signal composition of an embodiment of a still picture broadcasting signal.

As shown in FIG. 1, the still picture broadcasting signal is transmitted with a 5 second repetition period. In the 5 second repetition period, 5 sub-master frames SMF-*O*, SMF-1, . . . SMF-4 each having a 1 second period are transmitted sequentially. In this signal, an identical sub-master frame SMF is transmitted at each 5 seconds. One sub-master frame SMF consists of 30 television frames, of which the television frame frequency is 30 Hz. One of the 30 frames is used as a control frame C for accommodating various control signals. In the still picture transmission system, a pair of video and audio signals are used for representing one particular program and a number of programs are transmitted. The pair of signals are separately transmitted in time division multiplex from a transmitting end. In the receiving end the control signals are required in order to reproduce correctly a corresponding pair of signals of a selected program. 9 frames out of the 30 frames are used as video frames $V_1 - V_9$ and the other 20 frames are used as audio frames $A_{00} - A_{90}$, and $A_{01} - A_{91}$. In the series of such 30 sub-master frames SMF, the control frame C is situated at the beginning of the series.

Figure 2:
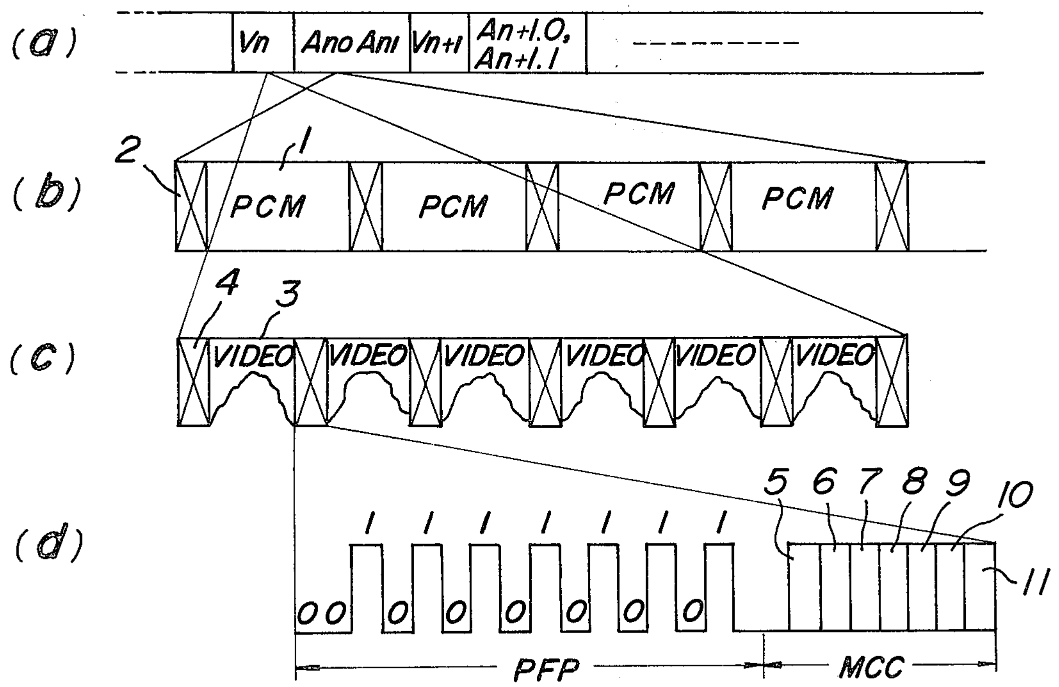

FIG. 2 is a diagram showing the signal waveform of the signals inserted in the video frame V and the audio frame A as shown in FIG. 1*a* and FIG. 1*b*. In the audio frame A, as shown in FIG. 2*b*, a pulse code modulated audio multiplex signal 1 and synchronizing signal 2 are inserted. The sampling period of the pulse code modulated audio multiplex signal 1, which is the same as the insertion period of the synchronizing signal 2, is $1/f_A$ wherein $f_A$ is nearly equal to 10.5 KHz. Hereinafter, the above period is referred to as an audio PCM frame period. In the video frame V, as shown in FIG. 2*c*, an NTSC video signal 3 and synchronizing signal 4 are inserted. The synchronizing signal 4 is inserted at each horizontal period $1/f_H$ ($f_H$=15.734 KHz). Accordingly, there exists the following relation.

$$f_A/f_H = 2/3$$

Therefore, the insertion positions of both the synchronizing signals 2 and 4 or the phase of both the synchronizing signals 2 and 4 coincide at the greatest common measure frequency of both the frequencies $f_H$ and $f_A$ of approximately 5 KHz, as shown in FIG. 2*d*. The synchronizing signal 2 or 4 is built from a blanking period BL, PCM frame pattern signal PFP (hereinafter referred to as PFP signal), and mode control signal MCC (hereinafter referred to as MCC signal). The PFP signal is a pulse series synchronized with the modulated pulse series by the audio multiplex signal. The pulse series has a fixed pulse pattern of 0101 of 16 bits. By using said fixed pulse pattern, the bit signal having a repetition frequency $f_b$=6.5454 MKz for obtaining timing of the pulse code modulated (PCM) signal is reproduced. The MCC signal is formed by an 8 bit signal and in the 8 bit signal, 7 kinds of synchronizing signals, i.e., horizonal synchronizing signal 5 having the repetition frequency of 15.734 KHz. PCM audio frame synchronizing signal 6 having the repetition frequency of about 10.5 KHz, frame synchronzing signal 7 having the repetition frequency of 30 Kz, synchronizing signal 8 showing the position of the control frame, synchronizing signals 9 and 10 for showing positions of 1st and 2nd audio frames, and synchronizing signal 11 for showing the position of the video signal are inserted. In these synchronizing signals 5 to 11, if the pulse has value 1, then the synchronizing signal is inserted and if the pulse has value 0, then the synchronizing signal is not inserted.

Figure 3:
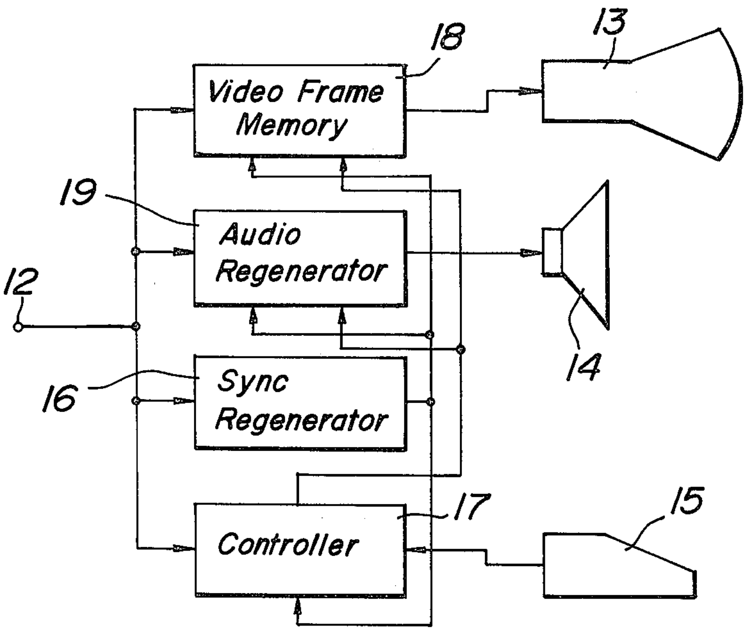
FIG. 3 is a schematic block-diagram showing the general idea of the still picture broadcasting signal receiver of the present invention.

The still picture broadcasting signal as indicated in FIGS. 1 and 2 may be received by a receiver as shown in FIG. 3.

FIG. 3 shows a simplified block-diagram of a receiver for the still picture broadcasting signal. In the drawing, 12 shows an input terminal to which the abovementioned still picture signal is supplied. 13 shows a Kinescope for reproducing the still picture. 14 is a speaker for reproducing the audio signal. 15 is an instruction keyboard by which a particular pair of video and audio signals can be selected by the audience. The still picture broadcasting signal supplied to the input terminal 12 is at first treated in the synchronizing signal regenerator 16 to take out only the synchronizing signal and to reproduce the synchronizing signal required for the reproduction of the still picture and the information is distributed into various portions of the receiver. By an instruction sent from the instruction keyboard 15, a controller 17 matches the control signal in the still picture broadcasting signal and detects the timing of a desired pair of video and audio signals and supplies a trigger pulse to a video frame memory 18 and audio regenerator 19. The video frame memory 18 takes out only the desired picture based on the trigger pulse and memorizes one frame picture in the memory and obtains a still picture by supplying the stored signal to the Kinescope 13 as a continuous signal. Audio regenerator 19 takes out a desired audio signal based on the trigger pulse and reproduces the voice by supplying said signal to a speaker 14.

Figure 4:
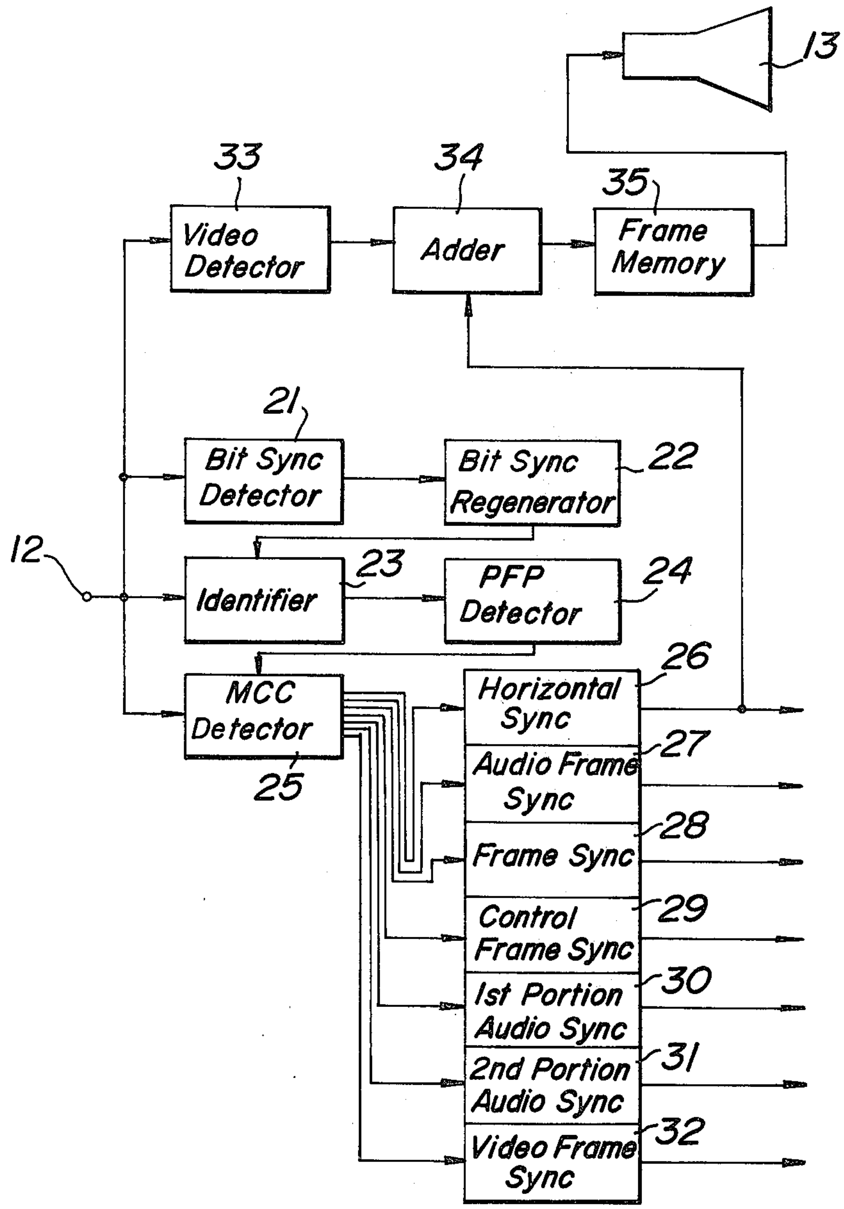
FIG. 4 is a block-diagram of the receiver of the present invention showing more details thereof.

A more detailed block-diagram of the receiver of the still picture broadcasting signal according to the present invention is shown in FIG. 4. In FIG. 4, 12 shows an input terminal to which the still picture broadcasting signal is supplied. 21 is a bit synchronizing detector, which detects a timing wave of the audio PCM frame and the PFP signal and supplies them to a bit synchronizing signal regenerator 22. The bit synchronizing signal regenerator 22 has a basic oscillator oscillating at a frequency equal to the bit repetition frequency and provides a reproduced bit synchronizing signal having the same phase and frequency with those of the supplied input timing wave and supplies it to an identifier 23. The identifier 23 utilizes said reproduced synchronizing signal as the timing wave and identifies the audio PCM signal in the still picture broadcasting signal and also effects waveform shaping. The identified signal is supplied to PFP detector 24. The PFP detector 24 checks at least the matching between the PFP signal pattern and the fixed pulse pattern of the identified signal and by using the periodic nature it detects the PFP signal. After the detection of the position of the PFP signal in the PFP detector 24, the detected PFP signal is supplied to MCC detector 25. In the MCC detector 25, an 8 bit MCC signal may easily be derived by using the detected PFP signal. If the MCC signal is detected in the MCC detector 25, as the respective positions of the 7 kinds in the synchronizing signals in the MCC signals are known, the synchronizing signals may easily be derived and reproduced. The 7 synchronizing signals are supplied to horizontal synchronization circuit 26, audio PCM frame synchronization circuit 27, frame synchronization circuit 28, control frame synchronization circuit 29, 1st portion audio frame synchronization circuit 30, 2nd portion audio frame synchronization circuit 31, and video frame synchronization circuit 32, respectively. By this means stable and continuous 7 kinds of synchronization signals may be reproduced. The repetition periods of the 7 synchronizing signals are 15.734 KHz, about 10.5 KHz, 30 Hz, 1 Hz, 10 Hz, 10 Hz, respectively. In the video signal of the still picture broadcasting signal, the horizontal synchronizing and the vertical synchronizing signal being able for amplitude separation from the video signal as in the case of an NTSC signal are not provided. Accordingly, in the receiver of the present invention, the still picture video signal detected by a video detector 33 is added with the horizontal synchronizing signal. Namely, the reproduced synchronizing signal obtained at an output of the horizontal synchronizing circuit 26 and at an output of the video frame synchronizing circuit 32 is added with the detected still picture video signal at the output of the video detector 33 in the adder 34 in a manner that it can be separated by amplitude separation. The composite still picture video signal added with the amplitude separable synchronizing signal is memorized in frame memory 35 and is repeatedly supplied to the Kinescope as an NTSC signal. According to the system of the present invention, a conventional NTSC receiver can be used as a monitoring receiver for the still picture broadcasting signal.

Figure 5:
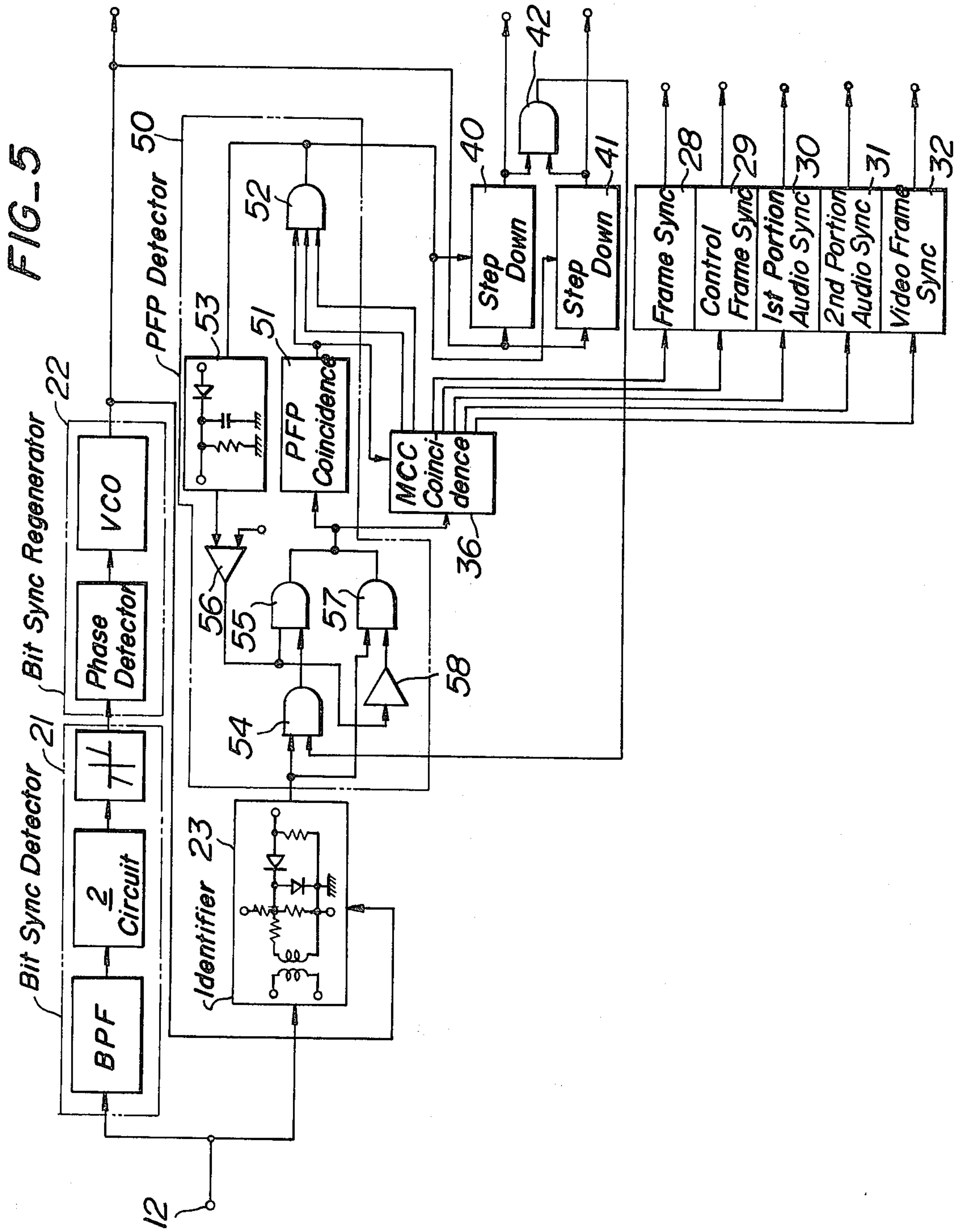
FIG. 5 is a block-diagram showing one embodiment of a synchronizing signal regenerator used in the receiver of the present invention.

More detail of the receiver of the present invention will be explained by referring to FIG. 5. FIG. 5 is a more detailed block-diagram of the receiver generally shown in FIG. 4, especially for the portion relating to synchronizing signal reproduction.

The bit synchronizing signal detector 21 comprises a band-pass-filter, a circuit having a square curve function such as a detector, and an amplitude selecting circuit detecting signals having an amplitude exceeding a predetermined amplitude. The detector 21 derives a signal having a component of bit synchronizing frequency from the input signal. By this detected signal, the bit synchronizing signal regenerator 22 formed by a combination of a phase detector and a voltage controlled oscillator is synchronized and a bit synchronizing signal of about 6.54 MHz synchronized with the input synchronizing signal can be obtained. By using the reproduced bit synchronizing signal as a timing signal, the amplitude of the input signal is identified by the identifier 23 and a correctly reproduced pulse signal is obtained after waveform shaping. The correctly shaped input signal is supplied to PFP detector 50.

In the PFP detector 50, the input pulse signal from the identifier 23 is supplied to a PFP coincidence circuit 51 through an AND gate 57 or through AND gates 54 and 55. The PFP coincidence circuit 51 comprises a fixed pattern generator generating the same pattern pulses as the PFP signal in the input signal and a comparator comparing each bit, bit by bit, and produces a coincidence pulse when the input PFP signal is supplied. The same input signal supplied to the PFP coincidence circuit 51 is further supplied to a separately provided MCC coincidence circuit 36, to which also an output signal from the PFP coincidence circuit 51 is supplied. By this circuit 36, the succeedingly transmitted MCC signal just after the PFP signal is detected by the respective codes for various synchronizing signals. The respective synchronizing signals may be produced in the case that the corresponding code in the MCC signal is 1. Coincidence pulses of the MCC signal representing the horizontal synchronizing signal having the frequency $f_H$ and the audio PCM frame synchronizing signal having the frequency $f_A$ among the number of reproduced synchronizing signals are supplied to three inputs of AND gate 52 together with the output signal of the PFP coincidence circuit 51. At the output of the AND gate 52, and output pulse is delivered only when said three coincidence pulses appear simultaneously. This output pulse from the AND gate 52 has the greatest common measure frequency of about 5 KHz of the horizontal synchronizing signal frequency $f_H$ of 15.734 KHz and the audio PCM frame synchronizing frequency $f_A$ of about 10.5 KHz. Said output pulse having the greatest common measure frequency of 5 KHz is applied to step-down circuits 40 and 41 as their reset pulse. These step-down circuits 40 and 41 count down the output reproduced signal of the bit synchronizing signal regenerator 22 as 1/416 and 1/624, respectively, and reproduce the horizontal synchronizing signal and audio PCM frame synchronizing signal, respectively.

By applying the thus obtained horizontal synchronizing signal and the audio PM frame synchronizing signal to an AND gate 42, an output pulse having the frequency which is the same as the greatest common measure frequency of the frequencies $f_H$ and $f_A$ at the output of the AND gate 52 may be obtained. By applying the output pulse from the AND gate 42 to an input of an AND gate 54 of which the other terminal is supplied with the input signal, only the synchronizing signal portion of the input signal having the greatest common measure frequency of the frequencies $f_H$ and $f_A$ can be derived from the input signal. This synchronizing signal portion corresponds to the PFP and MCC signal portion, and by this means a stable reproduction can be obtained by eliminating the unnecessary input signal portion.

At the transient status, such as at the time of starting of operation of the equipment, the output signals of the step-down circuits 40 and 41 may not be synchronized with the input synchronizing signal. Accordingly, the gated out input signal by the gate signal obtained from the output signal of the step-down circuits 40 and 41, i.e., that gated out by the output signal of the AND gate 42, may not include the synchronizing signal properly. In this case, the synchronization may not be obtained in principle. Therefore, in such a case of transience, the input signal should be supplied without interruption to the PFP coincidence circuit so as to detect the synchronizing signal at an early occasion. Under such object an AND gate 57 is provided. During a period when the frame synchronization is not attained, the ungated input signal is supplied through AND gate 57 to the PFP coincidence circuit 51. After achieving frame synchronization of the horizontal synchronizing signal and the audio PCM frame synchronizing signal, the gated input signal is supplied through the AND gate 55. The above switching may be effected in the following manner. After obtaining the PFP coincidence pulse and a coincidence pulse between the horizontal synchronizing signal and the audio PCM frame synchronizing signal, a pulse having a frequency of the greatest common measure frequency of $f_H$ and $f_A$ is obtained at the output of the AND gate 52, as explained above. Production of this pulse means an establishment of the frame synchronization. Therfore, the frame synchronization can be confirmed by detecting said pulses. Accordingly, the output pulses are supplied to an integrating circuit 53 so as to hold a voltage above a certain value for a certain period after application of a pulse thereto. The above voltage is supplied to a control circuit 56. This circuit 56 produces an output signal having a value "1" when the input voltage exceeds said certain value and produces output signal "0" when the voltage is less than said value. Output of the control circuit 56 is applied to an input of the AND gate 55 which passes the gated input signal and also to an inverter circuit 58. The inverter circuit 58 produces an output signal "0" when signal "1" is supplied to its input and produces an output signal "1" when signal "0" is supplied to its input. The output of the circuit 58 is supplied to an AND gate 57 which passes the ungated input signal. By this circuit construction, when the pulse signal is not obtained at the output of the AND gate 52, i.e., when the frame synchronization is not attained, a signal "0" is applied from the control circuit 56 to the AND gate 55 and to the inverter circuit 58. Accordingly, the gated input signal cannot pass the AND gate 55, but as signal "1" is obtained at an output of the inverter circuit 58, the ungated input signal passes the AND gate 57 and then is supplied to the PFP coincidence circuit 51 and thereafter to MCC coincidence circuit 36.

In the manner as substantially mentioned above, the bit synchronizing signal, the horizontal synchronizing signal, and the audio PCM frame synchronizing signal can be reproduced. The other synchronizing signals may be obtained by the respective reproducing circuits 28–32 by applying respective coincidence pulses from the MCC coincidence circuit 36 in which the synchronizing sisgnals are synchronized with the input synchronizing signal. The synchronizing signals are used in the various circuits of the device requiring the signals.

More details of the MCC coincidence circuit explained in FIG. 5 will be explained by referring to one preferred embodiment.

Figure 6:
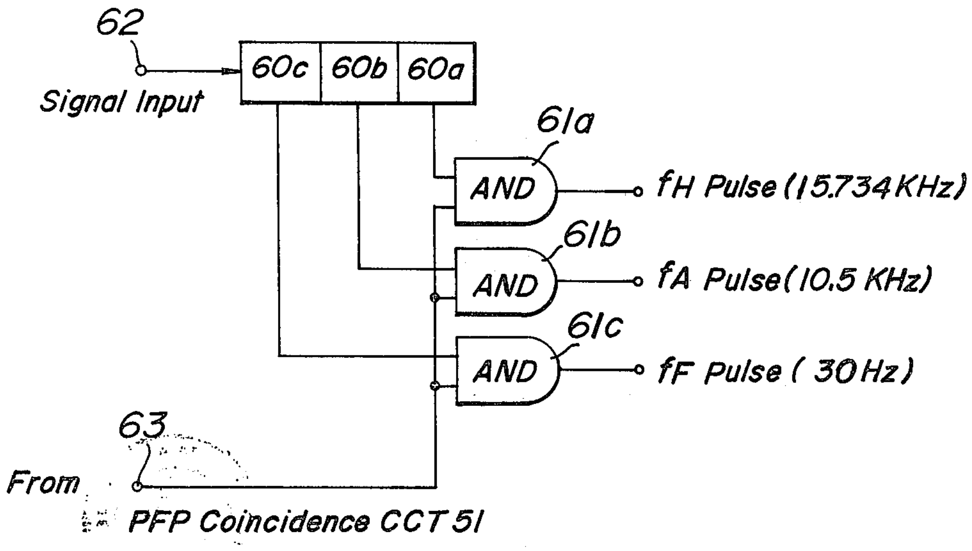
FIG. 6 is a circuit diagram of one embodiment of an MCC coincidence circuit shown in the block-diagram in FIG. 5.

FIG. 6 is a block-diagram showing a part of the MCC coincidence circuit including a detection circuit for three kinds of the synchronizing signals. A case in which code signals for deriving three kinds of the synchronizing signals, for example, the horizontal synchronizing signal $f_H$, audio PCM frame synchronizing signal $f_A$ and frame synchronizing signal $f_F$ of 30 Hz is considered.

In FIG. 6, 60*a* – 60*c* are shift registers. An input signal supplied from an input terminal 62 is shifted at each bit in a sequence of 60*c* → 60*b* → 60*a*. In the circuit of FIG. 5, it is so arranged that a coincidence pulse of the PFP signal appears in the PFP coincidence circuit 51 when the code signal 5 of the MCC signal representing the horizontal synchronization as shown in FIG. 2*d* appears as the input of the shift register 60*a*, the code signal 6 representing audio frame synchronization appears at the input of the shift register 60*b* and also the code signal 7 appears at the input of the shift register 60*c*. The above PFP coincidence signal is applied to respective one of the inputs of AND gates 61*a* – 61*c*. By this circuit arrangement, the MCC coincidence pulse can be obtained from the respective AND gates 61*a* – 60*c* only when the respective code signal representing a synchronizing signal is present at one of the inputs of the AND gates 61*a* – 60*c*. As for example, we may consider a case when the code signal 5 is 1, and code signals 6 and 7 are both 0 in the MCC signal shown in FIG. 2*d*. In this case, the shift register 60*a* has signal content 1 and PFP coincidence pulse is applied at terminal 63 so that at the output of the AND gate 61*a* the MCC coincidence pulse appears and at output of the AND gates 61*b* and 61*c* no output appears since both the shift registers 60*b* and 60*c* are 0.

For each of the other synchronization signals the same unit of circuit including the shift register and an AND gate may be provided.

A reproduction of the vertical synchronizing signal is required for the display of the still picture broadcasting signal by receiving the signal by an ordinary NTSC receiver. As explained in the foregoing the still picture broadcasting signal does not include the vertical synchronizing signal of 60 Hz, so that this signal should be produced in the receiver. Since there are obtainable the horizontal synchronizing signal $f_H$ and the frame synchronizing signal $f_F$ of 30 Hz, by using these two signals, the 60 Hz vertical synchronizing signal can be reproduced.

Figure 7:
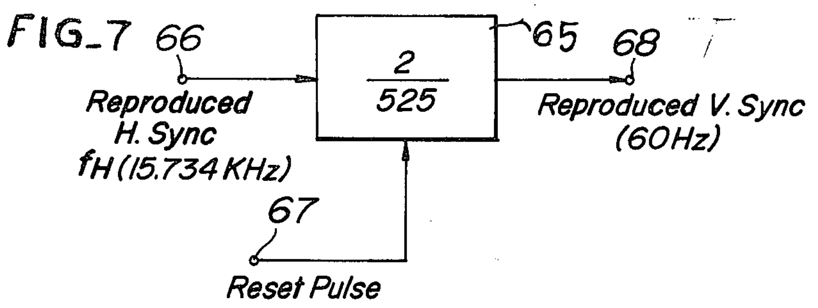
FIG. 7 is a block-diagram showing one embodiment of a vertical synchronizing signal reproducing circuit.

FIG. 7 shows one embodiment of the vertical synchronizing signal reproducing circuit. In this figure, 65 represents a step-down circuit dividing frequency of an input signal at 2/525, 66 is an input terminal, 67 is a terminal supplying the reset pulse and 68 is an output terminal. By using a horizontal synchronizing signal reproducing circuit, for instance, the step-down circuit 40 in FIG. 5, a horizontal synchronizing signal of 15,734 KHz is reproduced. This signal of 15.734 KHz is applied to the input terminal 66 and is divided into 60 Hz signals by the step-down circuit 65. For obtaining synchronization, the output signal from the reproducing circuit of the 30 Hz frame synchronizing signal is supplied to the terminal 67 for resetting the divider or step-down circuit 65; then a vertical synchronizing signal synchronized with the video signals can be obtained from the output terminal 68.

Figure 8:
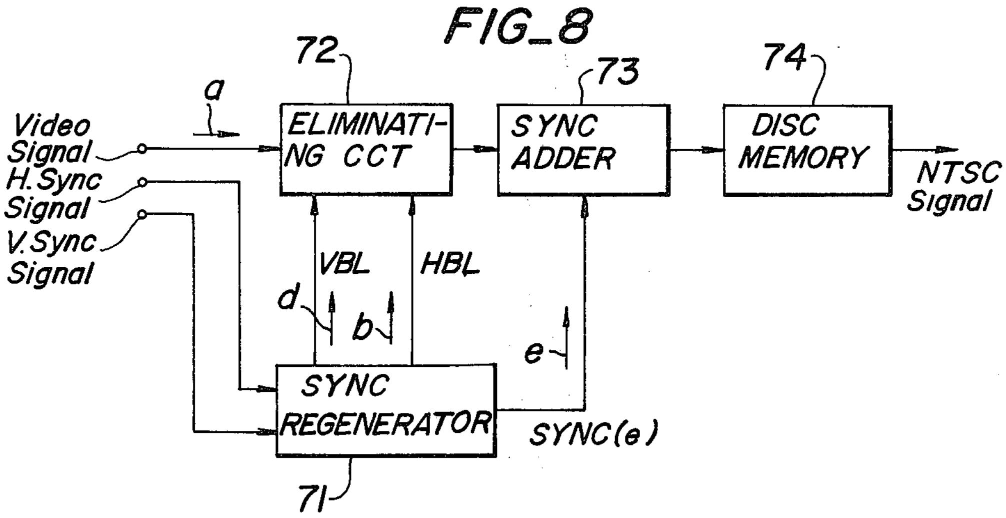
FIG. 8 is a block-diagram showing more detail of the adding circuit shown in FIG. 4.
Figure 9:
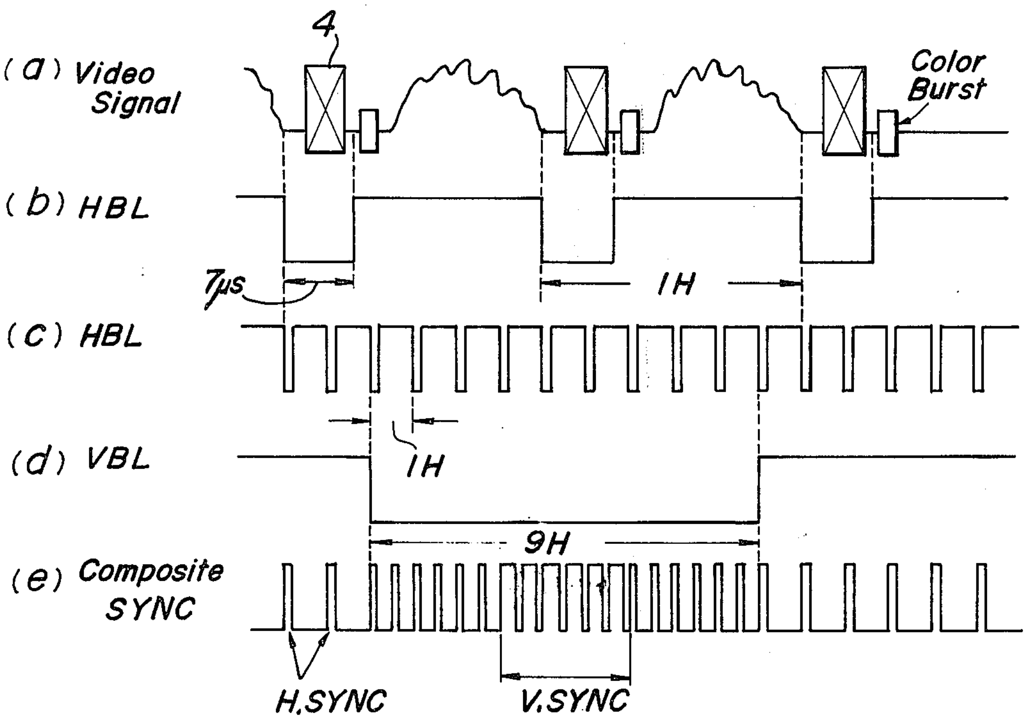
FIG. 9 shows signal waveform diagrams for explaining the operation of the adding circuit shown in FIG. 8.

Hereinafter, one practical embodiment of the adder 34 for adding the required synchronizing signal to a video signal will be explained in more detail. FIG. 8 is a block-diagram showing one embodiment of the adder circuit 34 and FIG. 9 illustrates signal waveform diagrams in the main circuit portions shown in FIG. 8. In FIG. 8, signals illustrated by *a*, *b*, *d*, and *e* together with small arrow marks correspond to the waveform shown in FIGS. 9*a*, 9*b*, 9*d*, and 9*e*. FIGS. 9*b* and 9*c* illustrate the same signals but in a different time scale. In FIG. 8, 71 is a synchronizing signal regenerator and is a circuit for producing a horizontal blanking pulse (HBL) and a vertical blanking pulse (VBL) based on the aforementioned horizontal synchronizing signal and vertical synchronizing signal obtained from the synchronizing signal circuits. 72 is an eliminating circuit for eliminating the PFP signal and MCC signal of the synchronizing signal 4 (hereinafter also referred to as digital synchronizing signal DS) from the video signal of the still picture broadcasting signal, 73 is a synchronizing signal adder for adding the synchronizing signal in a manner able to make amplitude separation into the still picture broadcasting signal eliminated by the digital synchronizing signal DS. 74 is a magnetic disc memory working as a frame memory for storing one video signal frame.

The video signal of the input still picture broadcasting signal shown in FIG. 9*a* which is the same as shown in FIG. 2*c* is applied to the eliminating circuit 72 and the digital synchronizing signal DS is eliminated by using the horizontal blanking pulse HBL shown in FIG. 9*b* produced in the synchronizing signal regenerator 71. Also by using the vertical blanking signal VBL shown in FIG. 9*d*, a signal portion corresponding to 9 times the 1 horizontal scanning period (hereinafter referred to as 9H) is eliminated. In the horizontal blanking pulse used in the standard NTSC system receiver, the color burst signal portion is removed as well but the horizontal blanking pulse used in this system is made much narrower in order to leave the color burst signal and is given a length of 7 $\mu$ from the leading edge of the front porch of the signal. The video signal from which the digital synchronizing signal DS had been eliminated is applied to the synchronizing signal adder 73 and combined with a composite synchronizing signal shown in FIG. 9e reproduced in the synchronizing signal regenerator 71 separately.

In the output of the synchronizing signal adder 73 a composite signal having an amplitude separable combined synchronizing signal which is the same as an ordinary NTSC signal can be obtained so that the output signal is recorded in the magnetic disc memory 74 and by using the stored signal repeatedly a still picture can be reproduced.

Figure 10:
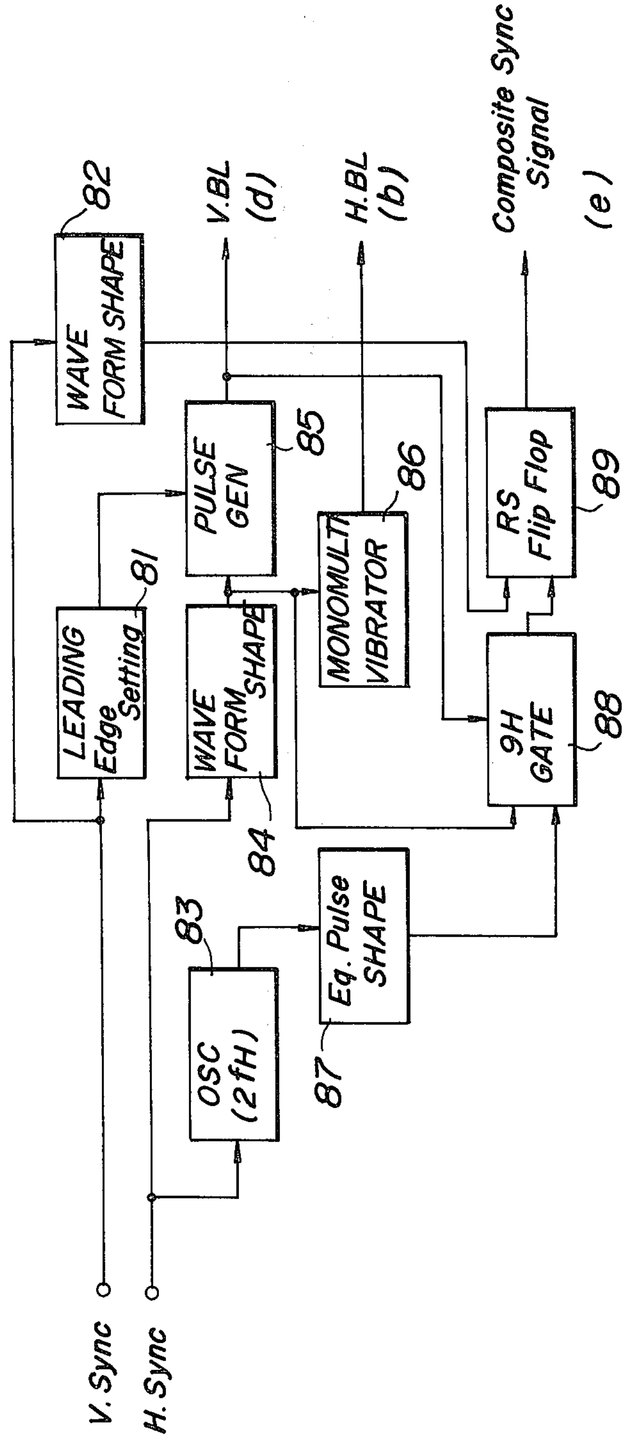
FIG. 10 is a more detailed block-diagram of one embodiment of the synchronizing signal regenerating circuit shown in FIG. 8.

More detail of the synchronizing signal regenerator 71 shown in FIG. 8 will be explained by referring to a detailed block-diagram shown in FIG. 10. The horizontal and vertical synchronizing signals as explained in the embodiment shown in FIGS. 5-7 have their periods and phases in coincident with the input synchronizing signal. However, these synchronizing signals cannot be used directly in an NTSC system receiver so that these synchronizing signals are converted into signals to be used in the NTSC receiver directly by the circuit shown in FIG. 10.

The vertical synchronizing signal obtained from the MCC coincidence circuit 36 and other circuit is applied to VBL leading edge setting circuit 81 for setting the leading edge of the vertical blanking period by time adjustment. By using said leading edge information, the vertical blanking pulse VBL shown in FIG. 9*d* is produced by producing pulses having 9H duration in the pulse generator 85 using the horizontal synchronizing pulse. The above mentioned input vertical synchronizing signal is further applied to a waveform shaping circuit 82 for shaping the vertical synchronizing signal. Double frequency of the horizontal synchronizing signal is produced in a voltage controlled oscillator 83 by applying to it the input horizontal synchronizing signal and horizontal equalizing pusles are formed in the equalizing pulse shaping circuit 87 by applying to it the output signal of the oscillator 83. The input horizontal synchronizing signal is further applied to a waveform shaping circuit 84 so as to obtain a waveform shaped horizontal synchronizing signal. The output of the circuit 84 is applied to the above mentioned pulse generator 85 for shaping the above mentioned vertical blanking pulse VBL shown in FIG. 9d. At the same time, this output signal is applied to a monostable multivibrator 86 to form the horizontal blanking pulse HBL shown in FIG. 9*b*. The waveform shaped horizontal synchronizing signal and horizontal equalizing pulses are supplied to 9H period gate circuit 88 so as to produce a signal having equalizing pulses over the 9H period and by applying the thus obtained signal to an RS flip-flop 89, to which also the waveform shaped vertical synchronizing signal is applied, a composite synchronizing signal shown in FIG. 9e can be obtained.

As substantially mentioned above, according to the present invention, a video signal not provided with an amplitude separable synchronizing signal such as the video signal in a still picture broadcasting signal can be received by using a conventional NTSC system receiver.

What is claimed is:

1. A receiver for receiving a composite still picture broadcasting signal having a multiplexed video signal and pulse code modulated audio signal, a first synchronizing signal synchronized with said pulse code modulated audio signal and a second synchronizing signal including a number of synchronizing signals required for the reproduction of said multiplexed video signal and pulse code modulated audio signal, one of said number of synchronizing signals being a horizontal synchronizing signal, said video signal and said pulse code modulated audio signal being time division multiplexed in a predetermined sequence, wherein said first and said second synchronizing signals are inserted in predetermined positions in said video signal and in said pulse code modulated audio signal, said first and second synchronizing signals not being amplitude separable from said multiplexed video signal and pulse code modulated audio signal, said horizontal synchronizing signal being inserted in a predetermined position with respect to the position of said first synchronizing signal, comprising:

first means for deriving and reproducing said first synchronizing signal synchronized with said pulse code modulated audio signal from said still picture broadcasting signal;

second means for deriving and reproducing said horizontal synchronizing signal included in said second synchronizing signal and required for the reproduction of said video signal, said second means including means for using said reproduced first synchronizing signal as a reference signal and means for detecting said horizontal synchronizing signal included in said composite still picture broadcasting signal;

third means for deriving said video signal from said composite still picture broadcasting signal;

means for adding said reproduced horizontal synchronizing signal to said derived video signal, said reproduced horizontal synchronizing signal having a larger amplitude than that of said derived video signal, whereby said added horizontal synchronizing signal may be amplitude separated from said derived video signal; and means for recording and for repeatedly reproducing said derived video signal added with said reproduced horizontal synchronizing signal.

2. A receiver for receiving a composite still picture broadcasting signal having a multiplexed video signal and pulse code modulated audio signal, a first synchronizing signal synchronized with said pulse code modulated audio signal and a second synchronizing signal including a number of synchronizing signals required for the reproduction of said multiplexed video signal and pulse code modulated audio signal, one of said number of synchronizing signals being a horizontal synchronizing signal, another of said number of synchronizing signals being a frame synchronizing signal, said multiplexed video signal and pulse code modulated audio signal being time division multiplexed in a predetermined sequence, wherein said first and said second synchronizing signals are inserted in predetermined positions in said video signal and in said pulse code modulated audio signal, said first and second synchronizing signals not being amplitude separable from said multiplexed video signal and pulse code modulated audio signal, said horizontal and frame synchronizing signals being inserted in predetermined positions with respect to the position of said first synchronizing signal, comprising;

first means for deriving and reproducing said first synchronizing signal synchronized with said pulse code modulated audio signal from said still picture broadcasting signal;

second means for deriving and reproducing said horizontal synchronizing signal and said frame synchronizing signal included in said second synchronizing signal and required for the reproduction of said video signal, said second means including means for detecting said horizontal synchronizing signal and said frame synchronizing signal included in said still picture broadcasting signal and means for using said reproduced first synchronizing signal as a reference signal;

means for obtaining a vertical synchronizing signal, said means for obtaining including a step down circuit, responsive to said reproduced horizontal synchronizing signal, for stepping down the frequency of said horizontal synchronizing signal, said step down circuit being responsive to said reproduced frame synchronizing signal for resetting said step down circuit;

third means for deriving said video signal from said still picture broadcasting signal;

means for adding said reproduced horizontal synchronizing signal and said vertical synchronizing signal to said derived video signal, said reproduced horizontal synchronizing signal and said vertical synchronizing signal having larger amplitudes than that of said derived video signal, whereby said added horizontal synchronizing signal and vertical synchronizing signal may be amplitude separated from said derived video signal; and means for recording and for repeatedly reproducing said derived video signal, said reproduced horizontal synchronizing signal and said vertical synchronizing signal.

3. A receiver for receiving a composite still picture broadcasting signal having a multiplexed video signal and pulse code modulated audio signal, a first synchronizing signal synchronized with said pulse code modulated audio signal and a second synchronizing signal including a number of synchronizing signals required for the reproduction of said multiplexed video signal and pulse code modulated audio signal, one of said number of synchronizing signals being a horizontal synchronizing signal, another of said number of synchronizing signals being a frame synchronizing signal, said multiplexed video signal and pulse code modulated audio multiplex signal being time division multiplexed in a predetermined sequence, wherein said first and said second synchronizing signals are inserted in predetermined positions in said video signal and in said pulse code modulated audio signal, said first and second synchronizing signals not being amplitude separable from said multiplexed video signal and pulse code modulated audio signal, said horizonal and frame synchronizing signals being inserted in predetermined positions with respect to the position of said first synchronizing signal, comprising;

first means for deriving and reproducing said first synchronizing signal synchronized with said pulse code modulated audio signal from said still picture broadcasting signal;

second means for deriving and reproducing said horizontal synchronizing signal and said frame synchronizing signal included in said second synchronizing signal and required for the reproduction of said video signal, said second means including means for detecting said horizontal synchronizing signal and said frame synchronizing signal included in said still picture broadcasting signal and means for using said reproduced first synchronizing signal as a reference signal;

means for obtaining a vertical synchronizing signal, said means for obtaining including a step down circuit, responsive to said reproduced horizonal synchronizing signal, for stepping down the frequency of said reproduced horizontal synchronizing signal, said step down circuit being responsive to said reproduced frame synchronizing signal for resetting said step down circuit;

third means for deriving said video signal and said first and second synchronizing signals from said still picture broadcasting signal;

means for eliminating said derived first and second synchronizing signals, said means for eliminating including means for generating a signal corresponding to said reproduced horizontal synchronizing signal and means for subtracting said generated signal from said derived first and second synchronizing signals;

means for adding said reproduced horizontal synchronizing signal and said vertical synchronizing signal to the eliminated position of said derived first and second synchronizing signals, said reproduced horizontal synchronizing signal and said vertical synchronizing signal having larger amplitudes than that of said derived video signals; and means for recording and for repeatedly reproducing said derived video signal, said reproduced horizontal synchronizing signal and said vertical synchronizing signal.

4. A receiver as claimed in claim 3 wherein said means for recording and for repeatedly reproducing said derived video signal, said reproduced horizontal synchronizing signal and said vertical synchronizing signal comprises a frame memory having a magnetic disc.

5. A receiver for receiving a composite still picture broadcasting signal having a multiplexed video signal and pulse code modulated audio signal, a first synchronizing signal synchronized with said pulse code modulated audio signal and a second synchronizing signal including a number of synchronizing signals required for the reproduction of said multiplexed video signal and pulse code modulated audio signal, one of said number of synchronizing signals being a horizontal synchronizing signal, said multiplexed video signal and pulse code modulated audio signal being time division multiplexed in a predetermined sequence, wherein said first and said second synchronizing signals are inserted in predetermined positions in said video signal and in said pulse code modulated audio signal, said first and second synchronizing signals not being amplitude separable from said multiplexed video signal and pulse code modulated audio signal, comprising:

- first means for deriving the first synchronizing signal synchronized with said pulse code modulated audio signal from said still picture broadcasting signal;
- a coincidence circuit, responsive to said derived first synchronizing signal, for generating a horizontal synchronizing coincidence pulse, said coincidence pulse being generated at a predetermined time with respect to receipt by said receiver of said second synchronizing signal;
- a horizontal synchronizing signal generator means, synchronized with said horizontal synchronizing coincidence pulse, for reproducing said horizontal synchronizing signal;
- second means for deriving said video signal from said still picture broadcasting signal;
- means for adding said reproduced horizontal synchronizing signal to said derived video signal, said reproduced horizontal synchronizing signal having a larger amplitude than that of said derived video signal; and
- means for recording and for repeatedly reproducing said derived video signal and said reproduced horizontal synchronizing signal.

6. A receiver for receiving a composite still picture broadcasting signal having a multiplexed video signal and pulse code modulated audio signal, a first synchronizing signal synchronized with said pulse code modulated audio signal and a second synchronizing signal including a number of synchronizing signals required for the reproduction of said multiplexed video signal and pulse code modulated audio signal, one of said number of synchronizing signals being a horizontal synchronizing signal, another of said number of synchronizing signals being a frame synchronizing signal, said multiplexed video signal and pulse code modulated audio signal being time division multiplexed in a predetermined sequence, wherein said first and second synchronizing signals are inserted in predetermined positions in said video signal and in said pulse code modulated audio signal, said first and second synchronizing signals not being amplitude separable from said multiplexed video signal and pulse code modulated audio signal, comprising:

- first means for deriving the first synchronizing signal synchronized with said pulse code modulated audio signal from said still picture broadcasting signal;
- a coincidence circuit, responsive to said derived first synchronizing signal, for generating a coincidence pulse at a time when said derived first synchronizing signal is supplied thereto;
- a plurality of shift registers, said registers receiving said composite still picture broadcasting signal and shifting said composite broadcasting signal at each bit into said registers
- a first AND gate having a first input terminal connected to an output terminal of one of said shift registers and a second input terminal supplied with said coincidence pulse, said first AND gate generating said horizontal synchronizing signal at an output of said first AND gate;
- a second AND gate having a first input terminal connected to an output terminal of another of said shift registers and a second input terminal supplied with said coincidence signal, said second AND gate generating said frame synchronizing signal at an output of said second AND gate;
- means for obtaining a vertical synchronizing signal, said means for obtaining including a step down circuit, responsive to said generated horizontal synchronizing signal, for stepping down the frequency of said generated horizontal synchronizing signal, said step down circuit being responsive to said generated frame synchronizing signal for resetting said step down circuit;
- second means for deriving said video signal from said still picture broadcasting signal;
- means for adding said generated horizontal synchronizing signal and said vertical synchronizing signal to said derived video signal, said generated horizontal synchronizing signal and said vertical synchronizing signal having larger amplitudes than that of said derived video signal, whereby said added horizontal synchronizing signal and vertical synchronizing signal may be amplitude separated from said derived video signal; and
- means for recording and for repeatedly reproducing said video signal, said generated horizontal synchronizing signal and said vertical synchronizing signal.

7. A receiver for receiving a composite still picture broadcasting signal having a multiplexed video signal and pulse code modulated audio signal, a first synchronizing signal synchronized with said pulse code modulated audio signal and a second synchronizing signal including a number of synchronizing signals required for the reproduction of said multiplexed video signal and pulse code modulated audio signal, one of said number of synchronizing signals being a horizontal synchronizing signal, another of said number of synchronizing signals being a frame synchronizing signal, said multiplexed video signal and pulse code modulated audio signal being time division multiplexed in a predetermined sequence, wherein said first and second synchronizing signals are inserted in predetermined positions in said video signal and in said pulse code modulated audio signal, said first and second syynchronizing signals not being amplitude separable from said multiplexed video signal and pulse code modulated audio signal, comprising:

- first means for deriving the first synchronizing signal synchronized with said pulse code modulated audio signal from said still picture broadcasting signal;
- a coincidence circuit, responsive to said derived first synchronizing signal, for generating a coincidence pulse at a time when said derived first synchronizing signal is supplied thereto;

a plurality of shift registers, said registers receiving said composite still picture broadcasting signal and shifting said composite broadcasting signal at each bit into said registers a first AND gate having a first input terminal connected to an output terminal of one of said shift registers and a second input terminal supplied with said coincidence pulse, said first AND gate generating said horizontal synchronizing signal at an output of said first AND gate;

a second AND gate having a first input terminal connected to an output terminal of another of said shift registers and a second input terminal supplied with said coincidence signal, said second AND gate generating said frame synchronizing signal at an output of said second AND gate;

means for obtaining a vertical synchronizing signal, said means for obtaining including a step down circuit, responsive to said generated horizontal synchronizing signal, for stepping down the frequency of said generated horizontal synchronizing signal, said step down circuit being responsive to said generated frame synchronizing signal for resetting said step down circuit;

second means for deriving said video signal and said first and second synchronizing signals from said still picture broadcasting signal;

means for eliminating said derived first and second synchronizing signals, said means for eliminating including means for generating a signal corresponding to said generated horizontal synchronizing signal and a means for subtracting said generated corresponding signal from said derived first and second synchronizing signals;

means for adding said generated horizontal synchronizing signal and said vertical synchronizing signal to the eliminated position of said derived first and second synchronizing signals, said generated horizontal synchronizing signal and said vertical synchronizing signal having larger amplitudes than that of said derived video signal; and means for recording and for repeatedly reproducing said video signal, said generated horizontal synchronizing signal and said vertical synchronizing signal.

* * * * *